United States Patent
Tsioptsias

(10) Patent No.: US 9,709,115 B2
(45) Date of Patent: Jul. 18, 2017

(54) METHOD FOR PRODUCING A FRICTION ELEMENT

(75) Inventor: Zisis Tsioptsias, Gmunden (AT)

(73) Assignee: Miba Frictec GmbH, Roitham (AT)

( * ) Notice: Subject to any disclaimer, the term of this patent is extended or adjusted under 35 U.S.C. 154(b) by 364 days.

(21) Appl. No.: 13/303,307

(22) Filed: Nov. 23, 2011

(65) Prior Publication Data

US 2012/0135183 A1 May 31, 2012

(30) Foreign Application Priority Data

Nov. 26, 2010 (AT) ................. A 1981/2010

(51) Int. Cl.
*F16D 69/02* (2006.01)
*F16D 69/00* (2006.01)

(52) U.S. Cl.
CPC ...... *F16D 69/026* (2013.01); *F16D 2069/005* (2013.01); *Y10T 428/23986* (2015.04); *Y10T 428/2933* (2015.01); *Y10T 428/31511* (2015.04)

(58) Field of Classification Search
CPC ... F16D 69/026; F16D 2069/005; B32B 5/02; B32B 27/38; B32B 33/00
USPC ................... 528/149; 428/323, 331
See application file for complete search history.

(56) References Cited

U.S. PATENT DOCUMENTS

| | | | |
|---|---|---|---|
| 5,004,089 A | 4/1991 | Hara et al. | |
| 5,083,650 A | 1/1992 | Seiz et al. | |
| 5,093,057 A | 3/1992 | Hara et al. | |
| 5,425,312 A * | 6/1995 | Tack, Jr. | B61F 5/32 105/218.1 |
| 5,516,587 A | 5/1996 | Tanaka et al. | |
| 5,858,883 A * | 1/1999 | Lam et al. | 442/101 |
| 8,021,744 B2 * | 9/2011 | Lam | F16D 69/026 428/292.1 |
| 2004/0043193 A1 * | 3/2004 | Chen et al. | 428/143 |
| 2005/0075413 A1 * | 4/2005 | Lam | 523/149 |
| 2005/0281971 A1 * | 12/2005 | Lam et al. | 428/36.4 |
| 2006/0009541 A1 * | 1/2006 | Chen et al. | 523/149 |
| 2009/0169836 A1 | 7/2009 | Thomas | |
| 2009/0324887 A1 * | 12/2009 | McCord | F16D 69/026 428/143 |
| 2010/0078287 A1 | 4/2010 | Gaffney et al. | |
| 2010/0330335 A1 * | 12/2010 | Ciupak | F16D 69/026 428/143 |

FOREIGN PATENT DOCUMENTS

| | | |
|---|---|---|
| DE | 31 17 823 A1 | 11/1982 |
| DE | 689 12 899 | 5/1994 |
| DE | 44 20 593 | 12/1994 |
| DE | 692 01 676 T2 | 10/1995 |

(Continued)

OTHER PUBLICATIONS

European Search Report of EP 11 19 0788, dated Aug. 10, 2012 (with English translation of relevant parts).

*Primary Examiner* — Cheryl Juska
(74) *Attorney, Agent, or Firm* — Collard & Roe, P.C.

(57) ABSTRACT

The invention relates to a method for producing a friction element (1) according to which a friction lining is applied onto a support element (2), which friction lining comprises at least one resin (5) and friction-modifying particles (6) and/or fibers (7), wherein the friction-modifying particles (6) and/or fibers (7) are mixed with the at least one resin (5) prior to application onto the support element (2).

28 Claims, 3 Drawing Sheets

(56) References Cited

FOREIGN PATENT DOCUMENTS

| | | |
|---|---|---|
| DE | 196 50 451 | 6/1997 |
| DE | 198 53 159 | 5/2000 |
| DE | 602 10 953 | 9/2006 |
| DE | 10 2009 042 621 | 4/2010 |
| EP | 1 413 793 A2 | 4/2004 |
| EP | 0 892 896 B1 | 7/2004 |
| EP | 1 521 010 A2 | 4/2005 |
| EP | 1 621 790 A1 | 2/2006 |
| EP | 1 750 031 A2 | 2/2007 |
| WO | WO 2010/145826 | 12/2010 |

\* cited by examiner

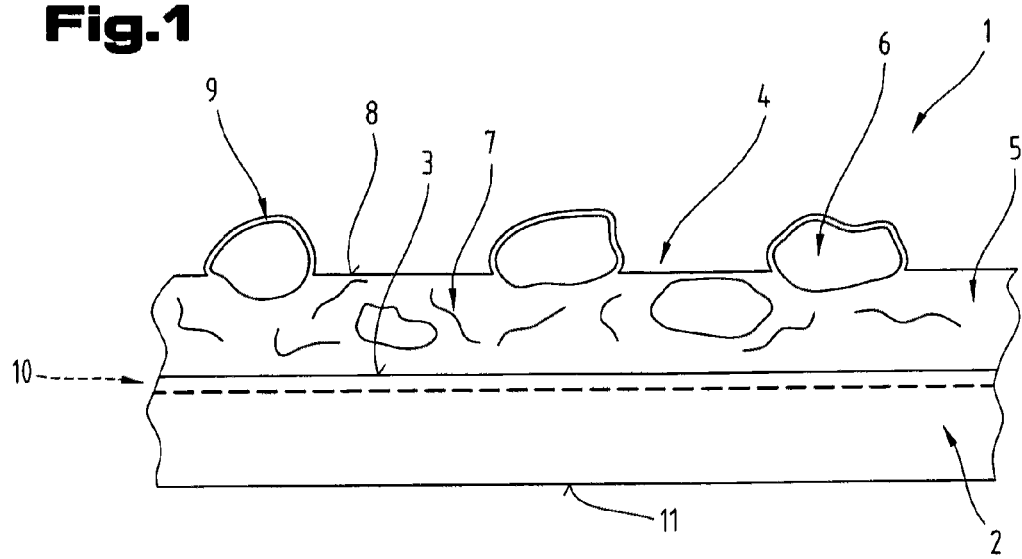
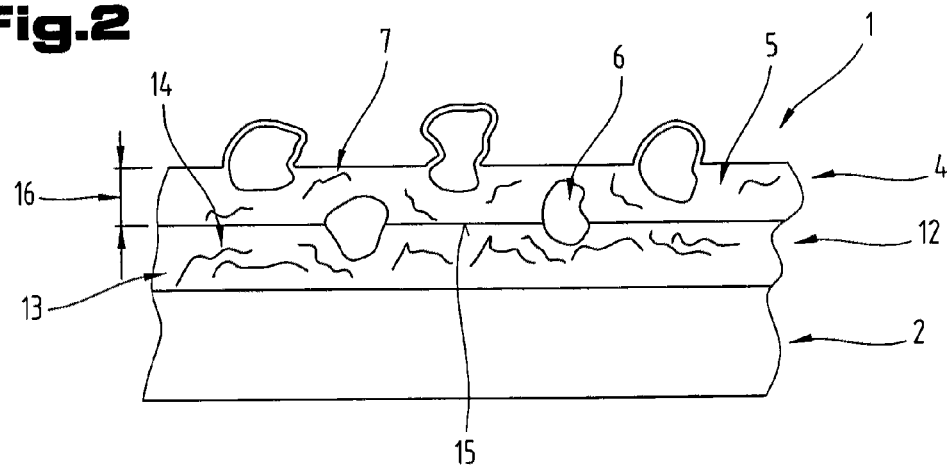
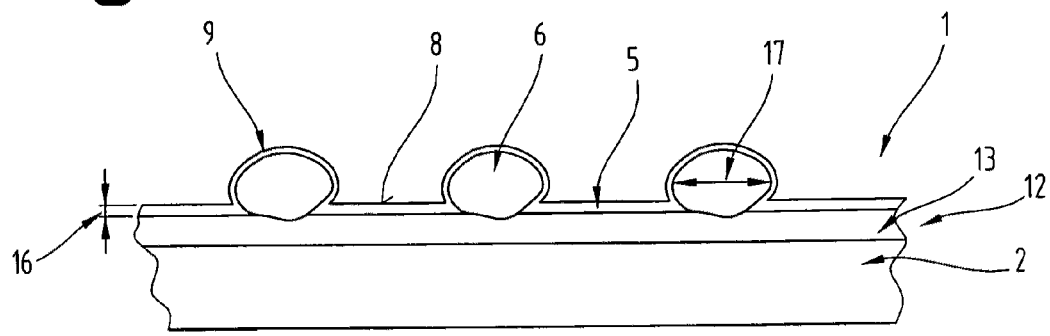

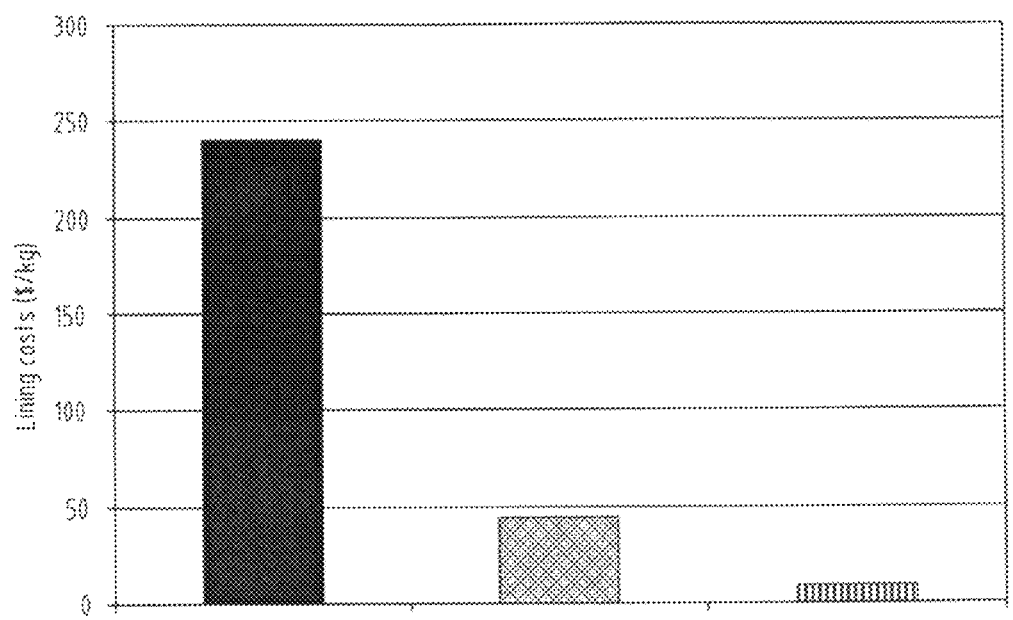

METHOD FOR PRODUCING A FRICTION ELEMENT

CROSS REFERENCE TO RELATED APPLICATIONS

Applicant claims priority under 35 U.S.C. §119 of Austrian Application No. A 1981/2010 filed on Nov. 26, 2010, the disclosure of which is incorporated by reference.

The invention relates to a method for producing a friction element according to which a friction lining is applied onto a support element, which friction lining comprises at least one resin and friction-modifying particles and/or fibers, comprising a friction lining or consisting of at least one resin and friction-modifying particles and/or fibers, wherein the proportion of resin is between 20 wt.-% and 70 wt.-% and the proportion of friction-modifying particles and/or fibers is between 30 wt.-% and 80 wt.-%, as well as a friction element comprising a support element, which has a friction lining on at least one of its surfaces.

Non-metallic friction linings for wet-running synchronizations and couplings are produced as a rule from a fiber material, fillers and a binding agent. The conventionally used fiber material consists for example of a carbon fiber, aramid fiber, phenolic resin fiber, wollastonite fiber or ceramic fiber or a fiber mixture. The fibers are woven or used as fleece or felt and can be used after soaking with the binding agent resin as wet-running friction linings. The fiber used has in general a very large influence on the tribological properties of the friction lining and is in most cases the most expensive component of the friction lining.

The objective of the present invention was to create a non-metallic friction lining, which has at least almost the tribological properties of a carbon friction lining, but is less expensive to produce.

Said objective is achieved by the method referred to above, according to which the friction-modifying particles and/or fibers are mixed with the at least one resin prior to application on the support element, also with the aforementioned said friction lining, in which the friction-modifying particles and/or fibers are distributed homogenously in the resin, or in which the proportion of fibers is selected from a range with a lower limit of 2 wt.-% and 15 wt.-%, and the friction-modifying particles are formed by a mixture of carbon, Celit (kieselgur with a honeycomb structure) and diatomaceous earth (kieselgur with a bulbous structure) in a total proportion of 28 wt.-% to 65 wt.-%, and by a friction element, which is provided with said friction lining.

The term "homogenous distribution" has the usual technical meaning of this term in the invention, wherein local, production-determined difference in concentration are permissible to the extent of ±5 wt.-%, i.e. as viewed over the entire friction lining the concentration of particles and/or fibers deviates by a maximum of ±5 wt.-% from an average value of the concentration, which corresponds to the respectively added proportion.

It is an advantage in this case that by mixing the fibers and/or particles into the resin the proportion of said components of the friction lining can be reduced, whereby by means of the homogenous distribution in the resin equally tribological properties can be achieved over the entire lifetime of the friction lining. In this way also the resin portion of the friction lining can be increased, whereby the strength of the friction lining is improved, however at the same time by means of the embedded fibers and particles a certain adjustability to the hard mating disc of a synchronization is retained. Compared to friction linings, in which the friction-modifying particles are scattered onto the resin—whereby the disadvantage is that after losing at least a portion of said particles the lining or the friction element has to be replaced—the proportion of friction-modifying particles and fibers in the friction lining itself is greater, whereby an additional matrix hardening of the resin is achieved. By mixing the particles and/or fibers into the resin before the latter is applied onto the support element, it is possible in addition to produce larger layer thicknesses of the friction lining more simply. By using Celit and diatomaceous earth on the one hand the specific weight of the friction lining can be reduced and on the other hand in this way also the oil absorbing ability of the friction lining can be improved, as said substances have a distinctive pore structure.

According to one embodiment variant of the method, the mixture of friction-modifying particles and/or fibers with the at least one resin is applied at a viscosity of the resin selected from a range with a lower limit of 1,000 cPs and an upper limit of 5,000 cPs, respectively at a temperature of 20° C. In this way a further homogenization of the property profile of the friction lining is achieved. If the resin mixture is applied onto the support element at a resin viscosity above 5,000 cPs, it is more difficult on the one hand to maintain the homogenous distribution, as heavier components of this mixture can sink. On the other hand, it has been observed that the porosity of the friction lining and thus also its tribological properties are reduced or worsened. At a resin viscosity of below 1,000 cPs it has been observed that particularly with higher solids contents in the resin the adhesion to the support element is worsened.

It is also possible that the mixture of friction-modifying particles and/or fibers with the at least one resin is applied prior to application onto a fiber layer. On the one hand via said fiber layer the compressibility of the friction element provided with the friction lining and thus the adjustability of the friction lining to the counter disc can be improved, and on the other hand in this way the production of the friction element can be simplified, in that semi-finished products can be produced from the mixture of resin with particles and/or fibers with a larger area and can be adjusted by cutting according to the respective application.

As the fiber layer in particular a fiber fleece is used, as compared to woven fiber layers, which can also be used in principle within the scope of the invention, the resin penetration and thus also the embedding of the particles and/or fibers into the fiber layer over the resin is better, so that the fiber layer itself also has greater rigidity than woven materials with simultaneous compressibility.

In principle very different fibers, such as e.g. cotton fibers etc. can be used, however for the preferred embodiment a fiber fleece of synthetic fibers can be used, in particular a fiber fleece of acrylic fibers and/or aramid fibers. In this way a friction lining can be produced, which on the one hand has high oil absorption ability, from which the absorbed oil is squeezed out more easily during the friction closure with an additional friction element, for example a counter disc. In addition, the friction lining in particular with the said fibers has improved mechanical and thermal strength.

In this case to improve said properties it has proved advantageous if a fiber fleece is used, which consists of fibers with a length selected from a range with a lower limit of 100 μm and an upper limit of 100 mm, as with fibers below 100 μm the cavity volume of the non-soaked fiber layer is reduced and thus said fiber layer is more compact, and with fibers above 100 mm precisely the opposite effect occurs, whereby the tribological properties of the friction lining are made worse. In addition, the manipulability of a fiber layer with fibers over 100 mm long is made worse, as said fiber layer only provides very loose cohesion between the fibers.

The fibers added to the mixture of resin and friction-modifying particles and fibers preferably have a length, which is selected from a range with a lower limit of 20 µm and an upper limit of 400 µm. In this way an improvement of the balance of properties of the friction lining is achieved, as although with fibers longer than 400 µm a better matrix hardness of the resin can be achieved, the homogeneity of the distribution of fibers in the resin or the resin layer suffers. However, with the use of fibers with a length of less than 20 µm the oil wetting ability and also the matrix hardening are made worse, as said fibers only act very locally in the friction lining.

The friction-modifying particles preferably have a maximum diameter of between 0.1 µm and 80 µm. The maximum diameter is defined as the largest diameter of a particle independently of the spatial direction. In this case the resistance to disintegration of the friction lining is improved in that it is avoided, in particular in association with the homogenous distribution of said particles in the resin, that between said particles the amount of available resin is too low. In other words the "filling volume" of the intermediate spaces between the particles is improved with the amount of particles used.

The mixture of friction-modifying particles and/or fibers with resin can be applied according to one embodiment variant onto a resin layer, which is applied prior to the application of the mixture of friction-modifying particles and/or fibers with resin onto the support element, whereby the adhesive strength of the friction lining on the support element can be improved, in particular if friction-modifying particles project over the surface of the resin. By having an additional resin layer said particles can be pushed into said resin layer, so that at the boundary of the friction lining/support element at least a completely continuous resin layer is formed.

According to one embodiment variant of the friction lining the carbon is a mixture of graphite, pyrolytic carbon and activated carbon. In this way the dry lubrication and the coefficient of friction behavior or friction characteristic can be adjusted more effectively. For these reasons the proportion of graphite is preferably between 10 wt.-% and 30 wt.-% and/or the proportion of pyrolytic carbon is between 15 wt.-% and 35 wt.-% and/or the proportion of activated carbon is between 5 wt.-% and 15 wt.-%.

With regard to the oil absorbing ability and the oil squeezing behavior of the friction lining it is an advantage if the proportion of Celit is preferably between 2 wt.-% and 7 wt.-%, and that of diatomaceous earth is preferably between 5 wt.-% and 15 wt.-%.

According to a further embodiment variant, hard materials, i.e. hard particles are included in the friction lining in a proportion of between 2 wt.-% and 8 wt.-%. In this way an additional reinforcement of the resin matrix is achieved, whereby the wearing resistance of the friction lining can be improved. In a proportion of below 2 wt.-% the reinforcing effect is too low, as per area unit of the friction lining too few particles are provided. In a proportion of more than 8 wt.-% however the strength of the friction lining is so great than the compressibility behavior suffers.

The hard materials are preferably selected from a group comprising or including ZrSiO4, SiC, SiO2, Al$_2$O$_3$ silicates, in particular island silicates, as with said hard materials owing to their hardness the proportion of hard materials in the friction lining can be reduced and thus the compressibility of the friction lining can be improved.

For reasons relating to the friction-modifying particles the hard particles preferably have an average particle size of between 0.1 µm and 80 µm.

The friction lining can be joined directly to the support element or, as explained above, connected via an additional resin layer.

For a better understanding of the invention the latter is explained in more detail with reference to the following figures.

In a schematically simplified view:

FIG. 1 shows part of a friction element in cross section;

FIG. 2 shows part of a friction element of an embodiment variant in cross section;

FIG. 3 shows part of a friction element of a different embodiment variant in cross section;

FIG. 6 shows a graphic representation of the production costs of the friction linings according to FIG. 4.

Figure 4:
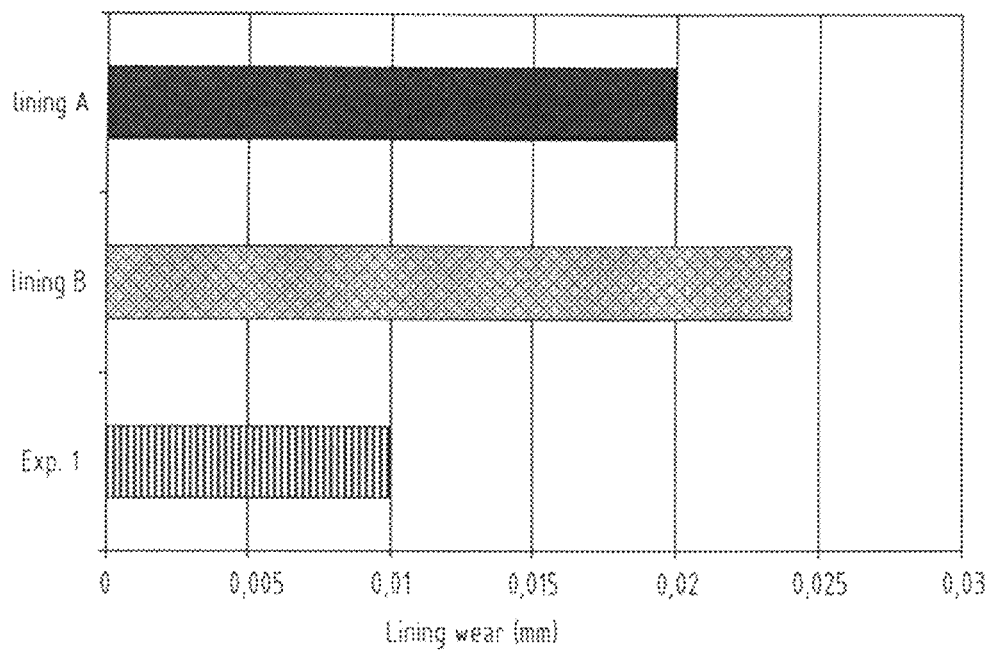
FIG. 4 shows the abrasion resistance of different friction linings.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

All of the details relating to value ranges given in the present description are defined such that the latter include the respective end range between the lower or upper limits of two part ranges, e.g. the range 1 to 10, in particular 3 to 8, is defined to include the end ranges 1 to 3, 1 to 8, 3 to 10 and 8 to 10.

FIG. 1 shows in part a cross section of a first embodiment variant of a friction element 1. Said friction element 1 consists of a support element 2, which has a friction lining 4 on one surface 3. The friction lining 4 comprises a resin 5 or resin mixture, which forms the matrix of the friction lining 4. Friction-modifying particles 6 and/or fibers 7 are embedded in the resin 5, in particular are distributed homogenously therein (according to the above explanations). Some of the friction-modifying particles 6 are arranged projecting over the friction lining surface 8, wherein also said particles 6 are surrounded by a resin layer 9 of resin 5. In other words all of the particles 6 and/or fibers 7 are embedded at least almost completely into the resin 5.

As indicated by dashed lines in FIG. 1, the friction lining 4 can be joined to the support element 2 by an adhesive layer 10. However, it is also possible that the friction lining 4 is joined to the support element 2 directly via the resin 5.

Although in this and also in all further embodiment variants the coating of only one surface 3 of the support element 2 with the friction lining 4 is shown, it is also possible to provide an additional surface 11 opposite said surface 3 with a friction lining 4.

FIG. 2 shows in part a cross section of a different embodiment variant of the friction element 1. The latter comprises the friction lining 4 with the resin 5 or the resin mixture, the friction-modifying particles 5 and/or fibers 7 contained therein, which friction lining is arranged on the support element 2.

Unlike the aforementioned embodiment variants however between the layer of resin 5 with the particles 6 and/or fibers 7 and the support element 2 an intermediate layer 12 is arranged which is joined to the two layers. Said intermediate layer 12 is preferably a fiber layer 13 with fibers 14, in particular a fleece layer, where any type of fleece can be used, for example both laid and random orientation fleeces.

Said fiber layer 13 can be infiltrated at least partly with a resin or resin mixture, in particular the resin 5 of the layer with the friction-modifying particles 6 and/or fibers 7. When using two different resins for the two layers of course the compatibility of the materials should be taken into account with regard to the selection of resins.

The intermediate layer 12 can also be a pure resin layer, which is used in particular as a bonding agent, wherein also in this case the same or different resins can be used for the two layers.

The intermediate layer 12 can also serve the purpose that particles 6 projecting over a lower friction lining surface 15 are pushed into said intermediate layer 12 during the production of the friction element 1, in order to avoid direct contact with the support element 2, and to avoid reducing the homogeneity of the distribution of particles 6 in the resin 5 by pushing away said particles 6 in the direction of the outer friction lining surface 8 when joining together the layers of the friction element 1.

In these two embodiment variants of the friction element the layer thickness 16 of the friction lining 4 is relatively large, in particular in a range of between 500 μm and 1000 μm, so that proportions of particles 6 can be embedded completely into the resin 5, without projecting over the friction lining surface 8.

In contrast to this FIG. 3 shows an embodiment variant of the friction element 1 in which the layer thickness 16 of the resin layer in the layer of resin 5 and friction-modifying particles 6—although not shown in this embodiment of the friction element 1 the fibers 7 can also be included in the resin 5—is smaller than a maximum diameter 17 (according to the above explanations relating to the maximum diameter) of the particles 6, in particular can be between 100 μm and 500 μm. For the above reasons the intermediate layer 12, in particular the fiber layer 13 is arranged between the layer of resin 5 with the particles 6 and the support element 2 and joined to the latter. Also in this embodiment variant the particles 6 projecting partly over the friction lining surface 8 are surrounded by the resin layer 9 of resin 5, in particular completely.

The friction element 1 is used for so-called wet-running applications, i.e. applications in which the friction lining 4 is wetted with a lubricant and coolant, for example in particular a synthetic oil. In principle, such friction discs are known from the prior art in a range of different geometric forms, which conform to the respective application. As this would be known by a person skilled in the art, reference is made here to the relevant literature.

The friction elements 1, for example friction discs, are used for example for single and multiple synchronizations, uncontrolled and controlled distributor gears, brakes, couplings, differential locks, torque vectoring applications, etc. In addition, the friction element 1 is arranged with an additional friction element so that during the activation of the respective device the friction element 1 enters into friction closure with the additional friction element. The number of friction elements 1 and additional friction elements—which can possibly also be formed by the friction elements 1, are normally designed to be made of different materials than the friction elements 1—is not restricted to two, but conforms to the level of friction required. For example per packet three, four, five, six, seven, eight, nine, ten to twenty etc. friction elements can be combined together to form a friction component group, i.e. for example a so-called disc packet.

Torque vectoring applications are defined for example as applications in driving dynamics, in which for example speed differences of a limited slip differential by said system are increased. In this way it is possible for example to support the steering of a vehicle, in that the driving torques are distributed unevenly to the wheels. In this way a higher torque can be steered to the curve outer wheel, so that in normal driving conditions oversteering can be adjusted.

In the preferred form of the invention the friction element 1 is used in single and multiple synchronizations as well as in couplings.

For the production of the friction element 1 the support element 2 is prepared in a first step. The latter can either consist of a solid material or a sintered material, where in the former case the support element 2 is cut or stamped from a suitable raw material, and where also a casting method is possible in principle. In particular, the support element 2 is made of steel, aluminum or an aluminum alloy, a copper alloy, such as brass or bronze etc. In principle, all of the materials known from the prior art can be used for such support elements 2.

In an additional step the mixture is produced from the resin 5 and the friction-modifying particles 6 and/or fibers, before the latter is applied onto the support element 2. In addition, the friction-modifying particles 6 and/or fibers 7 can be mixed into the melt-fluid resin and homogenized therein, for example by means of a mixing section with a mixing screw.

If a resin mixture is used the resins can be mixed previously or with the particles 6 and/or fibers.

This mixture can then be applied directly onto the surface 3 of the support element 1, dried, possibly pressed and hardened, possibly with an intermediate prehardening stage. The drying and hardening temperatures used in this case are suitable for the respective resin. For example, the drying temperature can be between 60° C. and 120° C., the hardening temperature between 160° C. and 350° C. and the prehardening temperature between 120° C. and 180° C. The pressing stage can be performed for example at a pressure of between 5 kN/m$^2$ and 20 kN/m$^2$, in particular at a temperature of the resin 5 of between 60° C. and 150° C. If necessary, as explained above the adhesive layer 10 can be applied prior to the application of the mixture with the resin 5 onto the support element 1. For example adhesives with a phenol or epoxy or polyamide-imide base can be used as the adhesives.

Furthermore, it is possible that the mixture of resin 5, particles 6 and/or fibers 7 and possibly additional additives, as explained further below, —in general said additives can be added to the resin 5 in all embodiment variants of the friction element 1 or friction lining 4—is calendered after the mixing process and then dried, pressed and hardened again, possibly prehardened, in order to obtain in this way a flat semi-finished product, that can then be cut accordingly to fit the support element and joined to the latter.

It is also possible however, that the particles 6 and/or fibers are coated with the resin 5 or the resin mixture, for example in a spraying method. This method is used in particular for the production of a friction element according to FIG. 3. In this case a "granulate" is formed, which can be scattered onto a resin layer, which was previously applied onto the support element 2 and is used principally as a binding layer. After the scattering the friction lining 4 can then be pressed and hardened, as explained above.

In all of the variants of the method it is possible that the mixture of resin 5, particles 6 and/or fibers 7 is applied onto a fiber layer 13 prior to its application onto the support element 2, so that said fiber layer 13 in the finished friction element 1 is arranged between the resin layer and the support element 2, wherein the fiber layer 13 is soaked at least partly with the mixture of resin 5, particles 6 and/or fibers 7 and/or with resin, which is possibly applied between the friction lining 4 and the support element 2, as explained above.

Thus in all of the embodiment variants of the method for producing the friction element 1 a paste-like mixture of resin 5 or the resin mixture and friction-modifying particles 6 and/or fibers 7 and possibly the additional additives is produced, which is then processed further into a friction lining 4 or into the finished friction element 1. Preferably, said paste-like mixture is applied at a viscosity of the resin selected from a range with a lower limit of 1,000 cPs, in particular 1,500 cPs, and an upper limit of 5,000 cPs, in particular 3,500 cPs, observed respectively at a temperature of 20° C. The viscosity can be adjusted on the one hand via the temperature, but on the other hand also by means of the proportion and the type of particles 6 and/or fibers 7 and possibly additional materials. It is also possible to add viscosity regulators to this mixture, for example alkoxylated alcohols, wherein their proportion in the total mixture can be between 1 wt.-% and 10 wt.-%.

As friction-modifying particles 6 in particular particles 6 are used, which are selected from a group comprising or consisting of $SiO_2$, $TiO_2$, $WO_2$, $Al_2O_3$, $ZrO_2$, carbon, Celit, diatomaceous earth, carbon-nanotubes, rubber particles, CNSL (Cashew Nut Shell Liquid), as well as mixtures thereof. The term friction-modifying is defined such that said particles are used to increase the coefficient of friction, for stability of the coefficient of friction, and to increase the adhesion of oil additives to the surface of the lining etc.

As the fibers 7 in addition to paper fibers any fibers 7 can be used, for example cotton fibers. Preferably however, synthetic fibers 7 are used, in particular acrylic fibers, carbon fibers, nitrile fibers, glass fibers or aramid fibers. Also mixtures of different fiber materials can be used, for example a mixture of acrylic and aramid fibers.

The total proportion of friction-modifying particles 6 and/or fibers 7—without the fibers 14 of the possibly provided fiber layer 13—in the friction lining 4 is selected from a range with a lower limit of 30 wt.-%, in particular 40 wt.-%, and an upper limit of 80 wt.-%, in particular 70 wt.-%. The total proportion of resin 5—without the possible additional resin layer—on the friction lining 4 is selected from a range with a lower limit of 20 wt.-%, in particular 30 wt.-%, and an upper limit of 70 wt.-%, in particular 60 wt-%.

In cases where a mixture of friction-modifying particles 6 and fibers 7 is used, the proportion of friction-modifying particles 6 is selected from a range with a lower limit of 25 wt.-%, in particular 28 wt.-%, and an upper limit of 65 wt.-%, in particular 60 wt.-% and the proportion of fibers 7 is selected from a range with a lower limit of 2 wt.-%, in particular 5 wt.-%, and an upper limit of 15 wt.-%, in particular 10 wt.-%.

In a particular embodiment a mixture of carbon, Celit and diatomaceous earth is used for the friction-modifying particles 6 in a total proportion of 28 wt.-% to 65 wt.-%. As the carbon graphite, pyrolytic carbon, activated carbon and kieselgur calcined with graphite can be used.

Preferably, the proportion of carbon consists of the mixture of graphite, pyrolytic carbon and activated carbon, wherein particularly preferably the proportion of graphite on the friction lining 4 is between 10 wt.-%, in particular 15 wt.-% and 30 wt.-%, in particular 25 wt.-%, and/or the proportion of pyrolytic carbon on the friction lining 4 is between 15 wt.-%, in particular 18.5 wt.-%, and 35 wt.-%, in particular 28 wt.-%, and/or the proportion of activated carbon on the friction lining 4 is between 5 wt.-%, in particular 7 wt.-%, and 15 wt.-%, in particular 12 wt.-%.

Preferably, the proportion of graphite to pyrolytic carbon to activated carbon is between 1:2:0.3 and 1:1:0.5.

The proportion of Celit in the friction lining 4 is between 2 wt.-%, in particular 3 wt-%, and 7 wt.-%, in particular 6 wt.-%.

The proportion of diatomaceous earth on the friction lining 4 is between 5 wt.-%, in particular 7 wt.-%, and 15 wt.-%, in particular 10 wt.-%. Preferably, the diatomaceous earth is calcined prior to use, in order to reduce the proportion of organic material.

Preferably, the proportion of diatomaceous earth to Celit is between 0.5:1 and 1:1.

In all of the embodiment variants as the resin 5 or resin mixture preferably a resin is used, which is selected from a group comprising or consisting of phenolic resins, melamine resins, amide resins, amide-imide resins, epoxy resins, silicone resins.

The friction lining 4 can also contain hard particles in a proportion of between 2 wt.-% and 8 wt.-%. Preferably, said hard particles are selected from a group consisting or comprising $ZrSiO_4$, SiC, $SiO_2$, $Al_2O_3$, or generally silicates, in particular island silicates.

Both the friction-modifying particles 6 and the hard particles preferably have a maximum particle size of between 0.1 μm, in particular 10 μm, and 80 μm, in particular 60 μm.

Preferably, the fiber fleece 13 like the fibers 7 in the resin 5 consists of synthetic fibers. Both for the fibers 7 in the resin 5 and for the fibers 14 of the fiber layer 13 fibers can be used with a length selected from a range with a lower limit of 100 μm, in particular 200 μm, and an upper limit of 100 mm, in particular 50 mm, wherein the fibers 7, which are added to the resin 5, preferably have a length of between 20 μm and 400 μm.

With friction lining 4 a friction element 1 can be produced, which presents a reduction of the friction lining wear when in use in wet-running synchronizations.

Table 1 shows several examples to ensure a better understanding of the friction lining 4.

TABLE 1

Examples of compositions:

|  | Example 1 [wt.-%] | Example 2 [wt.-%] | Example 3 [wt.-%] |
| --- | --- | --- | --- |
| Graphite | 15 | 17 | 15 |
| Pyrolytic carbon | 18 | 15 | 20 |
| Celit | 5 | 7 | 3 |
|  |  | Grade B | Grade A |
| Diatomaceous earth | 3 |  | 3 |
| $ZrSiO_4$ |  | 3 |  |
| Activated carbon | 5 | 6 | 5 |
| $Al_2O_3$ | 6 | 5 | 5 |
| Latex | 7 | 7 | 8 |

TABLE 1-continued

Examples of compositions:

|  | Example 1 [wt.-%] | Example 2 [wt.-%] | Example 3 [wt.-%] |
| --- | --- | --- | --- |
| ZrO$_2$ | 8 | 7 | 8 |
| Phenolic resin | 25 | 27 | 23 |
| Epoxy resin | 8 | 6 | 10 |

For comparison two friction linings were produced according to the prior art. In this case lining A had the composition 40% carbon fibers, 10% aramid fibers, 10% fillers, 40% resin and lining B had the composition of carbon tissue consisting of 70% carbon fibers and 30% resin.

The friction lining 4 according to Example 1 and friction linings A and B were attached respectively to a steel disc. Then the abrasion resistance of said friction elements and the behavior of the coefficient of friction was tested. The tests were carried out under the following test conditions: p spez.[N/mm$^2$] 3-9, v [m/s] 3-10, gyrating mass: 0.06 kgm$^2$.

Figure 5:
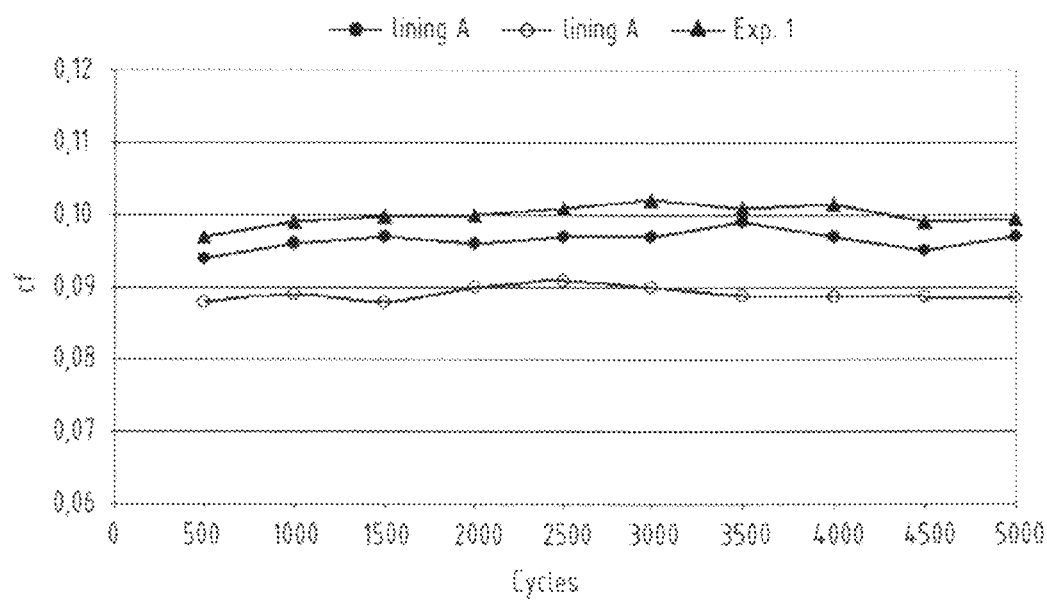
FIG. 5 shows a diagram of the behavior of the coefficient of friction of the friction linings according to FIG. 4 over time.

A steel mating disc was used respectively. The results are shown in FIGS. 4 and 5. In FIG. 4 the abrasion is entered in [mm] on the x-axis. As shown clearly, the friction lining 4 according to the invention (bottom bar) under the same conditions suffers 50% less abrasion than friction lining A (top bar) and significantly less abrasion than friction lining B (middle bar) according to the prior art.

FIG. 5 shows the frictional behavior of friction lining 4 according to Example 1 in Table 1, as well as of friction linings A and B over time, i.e. the number of shift cycles, which are entered on the x-axis. The y-axis shows the coefficient of friction cf. It can be seen clearly that the friction lining 4 according to the invention (triangles) on the one hand has a higher coefficients of friction than friction linings A (solid circles) and B (empty circles), and that on the other hand the coefficient of friction fluctuates only slightly over time, so that even after 5,000 shift cycles the friction lining 4 according to the invention still has the higher coefficient of friction.

For completion FIG. 6 shows a bar chart of the costs of the friction linings, wherein the x-axis shows friction lining 4 (right bar) and friction linings A (left bar) and B (middle bar) and the y-axis shows the costs in [$/kg]. It can be seen clearly that the friction lining 4 according to the invention incurs by far the lowest production costs.

The exemplary embodiments show possible embodiment variants of the friction element 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field Finally, as a point of formality, it should be noted that for a better understanding of the structure of the friction element 1, the latter and its components have not been represented true to scale in part and/or have been enlarged and/or reduced in size.

LIST OF REFERENCE NUMERALS

1 Friction element
2 Support element
3 Surface
4 Friction lining
5 Resin
6 Particle
7 Fiber
8 Friction lining surface
9 Resin layer
10 Adhesive layer
11 Surface
12 Intermediate layer
13 Fiber layer
14 Fiber
15 Friction lining surface
16 Layer thickness
17 Diameter

The invention claimed is:

1. A method for producing a friction element according to which a friction lining is applied onto at least one of a first surface and a second surface of a support element, which friction lining comprises a resin layer comprising at least one resin, friction-modifying particles and particle-sized fibers, wherein the proportion of resin is between 20 wt.-% and 70 wt.-% and the total proportion of friction-modifying particles and particle-sized fibers is between 30 wt.-% and 80 wt.-%, wherein the friction-modifying particles and particle-sized fibers are mixed with the at least one resin prior to application onto the support element, the mixing creating a homogeneous distribution of the friction-modifying particles and particle-sized fibers in the at least one resin, and wherein the resin layer forms a friction surface,
wherein the friction lining is joined directly to the support element, or
wherein the resin layer of the friction lining is applied onto an intermediate resin-infiltrated fiber layer on said support element, wherein said intermediate resin-infiltrated fiber layer is infiltrated with a resin which is identical with the resin of the resin layer with the friction-modifying particles and particle-sized fibers.

2. The method as claimed in claim 1, wherein a fiber fleece is used as the intermediate resin-infiltrated fiber layer.

3. The method as claimed in claim 2, wherein a fiber fleece made of synthetic fibers is used.

4. The method as claimed in claim 3, wherein a fiber fleece is used which consists of fibers with a length selected from a range with a lower limit of 100 μm and an upper limit of 100 mm.

5. The method as claimed in claim 1, wherein the particle-sized fibers have a length selected from a range with a lower limit of 20 μm and an upper limit of 400 μm.

6. The method as claimed in claim 1, wherein friction-modifying particles are used, which have a diameter of between 0.1 μm and 80 μm.

7. The method as claimed in claim 1, wherein the mixture of friction-modifying particles and particle-sized fibers with resin is applied onto the intermediate resin-infiltrated resin layer, which prior to the application of the mixture of friction-modifying particles and particle-sized fibers with resin is applied onto the support element.

8. A friction element comprising:
a support element having a first surface and a second surface, and
a friction lining on at least one of the first and second surfaces, wherein the friction lining comprises a resin layer comprising at least one resin, friction-modifying particles and particle-sized fibers, wherein the proportion of resin is between 20 wt.-% and 70 wt.-% and the total proportion of friction-modifying particles and particle-sized fibers is between 30 wt.-% and 80 wt.-%, wherein the friction-modifying particles and particle-sized fibers are mixed with the resin, creating a homogeneous distribution of the friction-modifying particles and particle-sized fibers in the resin layer, and wherein the resin layer forms a friction surface, wherein the friction lining is joined directly to the support element, or wherein the resin layer of the friction lining is applied onto an intermediate resin-infiltrated fiber layer on said support element, wherein said intermediate resin-infiltrated fiber layer is infiltrated with a resin which is identical with the resin of the resin layer with the friction-modifying particles and particle-sized fibers.

9. The friction element as claimed in claim 8, wherein the friction element also contains reinforcement particles in a proportion of between 2 wt.-% and 8 wt.-%.

10. The friction element as claimed in claim 9, wherein the reinforcement particles are selected from a group consisting of $ZrSiO_4$ silicates, SiC silicates, $SiO_2$ silicates, and $Al_2O_3$ silicates.

11. The friction element as claimed in claim 8, wherein the friction-modifying particles have a particle size of between 0.1 μm and 80 μm.

12. The friction element as claimed in claim 9, wherein the reinforcement particles have a particle size of between 0.1 μm and 80 μm.

13. The friction element as claimed in claim 8, wherein the particle-sized fibers have a length of between 20 μm and 400 μm.

14. The friction element as claimed in claim 8, wherein the intermediate resin-infiltrated fiber layer is a fiber fleece.

15. The friction element as claimed in claim 14, wherein the fiber fleece is made of acrylic fibers or aramid fibers.

16. The friction element as claimed in claim 8, wherein the intermediate resin-infiltrated fiber layer comprises fibers with a length of between 100 μm and 100 mm.

17. The friction element as claimed in claim 8, wherein the proportion of particle-sized fibers is selected from a range of 2 wt.-% to 15 wt.-%, and the friction-modifying particles are formed by a mixture of carbon, kieselgur having a honeycomb structure and diatomaceous earth having a bulbous structure in a total proportion of 28 wt.-% to 65 wt.-%.

18. The friction element as claimed in claim 8, wherein the proportion of diatomaceous earth having a bulbous structure to kieselgur having a honeycomb structure is between 0.5:1 and 1:1.

19. A friction element comprising:
a support element having a first surface and a second surface, and
a friction lining on at least one of the first and second surfaces, wherein the friction lining comprises a resin layer comprising at least one resin, friction-modifying particles and particle-sized fibers, wherein the proportion of resin is between 20 wt.-% and 70 wt.-% and the total proportion of friction-modifying particles and particle-sized fibers is between 30 wt.-% and 80 wt.-%, wherein the friction-modifying particles and particle-sized fibers are mixed with the resin, creating a homogeneous distribution of the friction-modifying particles and particle-sized fibers in the resin layer, wherein the proportion of particle-sized fibers is selected from a range of 2 wt.-% to 15 wt.-%, and the friction-modifying particles are formed by a mixture of carbon, kieselgur having a honeycomb structure and diatomaceous earth having a bulbous structure in a total proportion of 28 wt.-% to 65 wt.-%, and wherein the resin layer forms a friction surface, wherein the friction lining is joined directly to the support element, or wherein the resin layer of the friction lining is applied onto an intermediate resin-infiltrated fiber layer on said support element, wherein said intermediate resin-infiltrated fiber layer is infiltrated with a resin which is identical with the resin of the resin layer with the friction-modifying particles and particle-sized fibers.

20. The friction element as claimed in claim 19, wherein the carbon is a mixture of graphite, pyrolytic carbon and activated carbon.

21. The friction element as claimed in claim 20, wherein the proportion of graphite is between 10 wt.-% and 30 wt.-%.

22. The friction element as claimed in claim 20, wherein the proportion of pyrolytic carbon is between 15 wt.-% and 35 wt.-%.

23. The friction element as claimed in claim 20, wherein the proportion of activated carbon is between 5 wt.-% and 15 wt.-%.

24. The friction element as claimed in claim 19, wherein the proportion of kieselgur having a honeycomb structure is between 2 wt.-% and 7 wt.-%.

25. The friction element as claimed in claim 19, wherein the proportion of diatomaceous earth having a bulbous structure is between 5 wt.-% and 15 wt.-%.

26. The friction element as claimed in claim 19, wherein the friction lining also contains reinforcement particles in a proportion of between 2 wt.-% and 8 wt.-%.

27. The friction element as claimed in claim 19, wherein the friction-modifying particles have a particle size of between 0.1 μm and 80 μm.

28. The friction element as claimed in claim 19, wherein the proportion of diatomaceous earth having a bulbous structure to kieselgur having a honeycomb structure is between 0.5:1 and 1:1.

* * * * *